US007340156B2

United States Patent
Ishii et al.

(10) Patent No.: US 7,340,156 B2
(45) Date of Patent: Mar. 4, 2008

(54) INFORMATION STORAGE MEDIUM WITH AGGREGATE ATTRIBUTE INFORMATION, AND APPARATUS FOR REPRODUCING THE SAME

(75) Inventors: Hidehiro Ishii, Tokorozawa (JP); Shozo Ema, Tokorozawa (JP); Takao Sawabe, Tokyo-to (JP); Yoshinori Hasegawa, Tokorozawa (JP); Kaoru Yamamoto, Tsurugashima (JP); Tokihiro Takahashi, Kawagoe (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/131,941

(22) Filed: Aug. 10, 1998

(65) Prior Publication Data
US 2003/0189879 A1 Oct. 9, 2003

(30) Foreign Application Priority Data
Aug. 14, 1997 (JP) ............................... P09-219418

(51) Int. Cl.
*H04N 5/91* (2006.01)
*H04N 7/26* (2006.01)
(52) U.S. Cl. ........................ 386/99; 386/105; 386/106; 386/126; 369/275.3
(58) Field of Classification Search ................ 386/106, 386/126, 99, 112, 105; 369/275.3; *G11B 7/085, G11B 7/00, 7/24; H04N 5/91, 7/00, 7/26, H04N 5/00*

See application file for complete search history.

(56) References Cited

U.S. PATENT DOCUMENTS

| 4,229,808 A | * | 10/1980 | Hui ........................ 369/53.14 |
| 5,128,774 A | * | 7/1992 | Takayama ................... 386/106 |
| 5,592,450 A | * | 1/1997 | Yonemitsu et al. .......... 369/48 |
| 5,651,087 A | * | 7/1997 | Nagano et al. ............... 386/51 |
| 5,742,569 A | * | 4/1998 | Yamamoto et al. ...... 369/30.18 |
| 5,745,643 A | * | 4/1998 | Mishina ..................... 386/106 |
| 5,778,142 A | * | 7/1998 | Taira et al. ................. 386/106 |
| 5,805,537 A | * | 9/1998 | Yamaamoto et al. ..... 369/49 X |
| 5,825,726 A | | 10/1998 | Hwang et al. ................ 369/32 |
| 5,838,678 A | * | 11/1998 | Davis et al. ................ 370/389 |
| 5,936,925 A | * | 8/1999 | Yoshio et al. ................ 369/60 |
| 5,953,290 A | | 9/1999 | Fukuda et al. .......... 434/307 A |

(Continued)

FOREIGN PATENT DOCUMENTS

DE 003914588 * 11/1990 ................. 386/106

(Continued)

OTHER PUBLICATIONS

Extended audio-video system Ludeman, IBM Tech. Disclosure Bulletin, vol. 19, No. 5, pp. 1546-1547, Oct. 1976.*

*Primary Examiner*—Aristotelis M. Psitos
(74) *Attorney, Agent, or Firm*—Drinker Biddle & Reath LLP

(57) ABSTRACT

An information storage medium includes: a plurality of unit audio information to be reproduced independently of each other; aggregate audio information each including one or more of the unit audio information; unit attribute information indicating attributes of the unit audio information included in the aggregate audio information; and aggregate attribute information including the unit attribute information corresponding to the aggregate audio information recorded on the storage medium. By referring to the aggregate attribute information, the attributes of all the unit audio information may be readily and quickly obtained.

37 Claims, 10 Drawing Sheets

U.S. PATENT DOCUMENTS

| | | | |
|---|---|---|---|
| 5,987,417 A * | 11/1999 | Heo et al. | 386/106 X |
| 6,014,495 A * | 1/2000 | Moriyama et al. | 386/96 |
| 6,104,684 A * | 8/2000 | Moriyama et al. | 386/96 |
| 6,124,895 A * | 9/2000 | Fielder | 348/515 |
| 6,151,441 A | 11/2000 | Kawamura et al. | 386/95 |

FOREIGN PATENT DOCUMENTS

| | | | | |
|---|---|---|---|---|
| EP | 0 724 264 | | 7/1996 | |
| EP | 0 757 506 | | 2/1997 | |
| EP | 000800164 A2 | * | 8/1997 | |
| EP | 0 797 197 | | 9/1997 | |
| EP | 0 797 205 | | 9/1997 | |
| EP | 0 855 715 | | 7/1998 | |
| EP | 0 856 849 | | 8/1998 | |
| JP | 403185680 | * | 8/1991 | 386/106 |
| JP | 405159525 | * | 6/1993 | 386/106 |
| JP | 405242606 | * | 9/1993 | 386/106 |
| JP | 405258461 | * | 10/1993 | 386/106 |
| JP | 06-215482 | | 8/1994 | |
| JP | 07-262691 | | 10/1995 | |
| JP | 08-336104 | | 12/1996 | |
| JP | 09-063252 | | 3/1997 | |
| JP | 09-115269 | | 5/1997 | |
| WO | 97/15924 | | 5/1997 | |

* cited by examiner

LOGICAL STRUCTURE OF RECORDED INFORMATION
(LOGICAL FORMAT)

| AUDIO CODING MODE | MULTICHANNEL INFORMATION | AUDIO TYPE | APPLICATION TYPE | QUANTIZATION BIT NUMBER | SAMPLING FREQUENCY | NUMBER OF AUDIO CHANNELS | EMPHASIS | |
|---|---|---|---|---|---|---|---|---|
| 15h | 15i | 15j | 15k | 15l | 15m | 15o | 15p | |

AUDIO CODING MODE
- 000: DOLBY AC-3
- 010: MPEG-1 OR MPEG-2
- 011: MPEG-2
- 100: LINEAR PCM

MULTICHANNEL INFORMATION
- 0: MULTICHANNEL INFORMATION EXIST
- 1: MULTICHANNEL INFORMATION NOT EXIST

AUDIO TYPE
- 00: NOT SPECIFIED
- 01: LANGUAGE INCLUDED

APPLICATION TYPE
- 00: NOT SPECIFIED
- 01: KARAOKE
- 10: SURROUND

QUANTIZATION BIT NUMBER
- 00: 16BITS
- 01: 20BITS
- 10: 24BITS
- 11: (RESERVED)

SAMPLING FREQUENCY
- 00: 48KHZ
- 01: 96KHZ

NUMBER OF AUDIO CHANNELS
- 000: 1CH
- 001: 2CH
- 010: 3CH
- 011: 4CH
- 100: 5CH
- 101: 6CH
- 110: 7CH
- 111: 8CH

EMPHASIS
- 00: NOT APPLIED
- 01: APPLIED

FIG. 6

| | Group No. | Track No. | Start address | End address | Audio Attribute | Playback Time |
|---|---|---|---|---|---|---|
| 1 | 1 | | | | | Total Playback Time |
| 2 | 1 | 1 | 50000 | 60000 | LPCM, 48k, 16bit, 2ch, E-ON | Track Playback Time |
| 3 | 1 | 2 | 60001 | 70000 | LPCM, 48k, 16bit, 2ch, E-ON | Track Playback Time |
| 4 | 1 | 3 | 70001 | 80000 | LPCM, 48k, 16bit, 2ch, E-ON | Track Playback Time |
| 5 | 1 | 4 | 80001 | 90000 | LPCM, 48k, 16bit, 2ch, E-ON | Track Playback Time |
| 6 | 1 | 5 | 90001 | 100000 | LPCM, 48k, 16bit, 2ch, E-ON | Track Playback Time |
| 7 | 1 | 6 | 100001 | 110000 | LPCM, 48k, 16bit, 2ch, E-ON | Track Playback Time |
| 8 | 2 | | | | | Total Playback Time |
| 9 | 2 | 1 | 1000000 | 1010000 | LPCM, 96k, 24bit, 3ch, E-OFF | Track Playback Time |
| 10 | 2 | 2 | 1010001 | 1020000 | LPCM, 96k, 24bit, 3ch, E-OFF | Track Playback Time |
| 11 | 2 | 3 | 1020001 | 1030000 | LPCM, 96k, 24bit, 3ch, E-OFF | Track Playback Time |
| 12 | 2 | 4 | 1030001 | 1040000 | LPCM, 96k, 24bit, 3ch, E-OFF | Track Playback Time |
| 13 | 3 | | | | | Total Playback Time |
| 14 | 3 | 1 | 60001 | 70000 | LPCM, 48k, 16bit, 2ch, E-ON | Track Playback Time |
| 15 | 3 | 2 | 1020001 | 1030000 | LPCM, 96k, 24bit, 3ch, E-OFF | Track Playback Time |
| 16 | 3 | 3 | 1010001 | 1020000 | LPCM, 96k, 24bit, 3ch, E-OFF | Track Playback Time |
| 17 | 3 | 4 | 1030001 | 1040000 | LPCM, 96k, 24bit, 3ch, E-OFF | Track Playback Time |
| 18 | 3 | 5 | 90001 | 100000 | LPCM, 48k, 16bit, 2ch, E-ON | Track Playback Time |

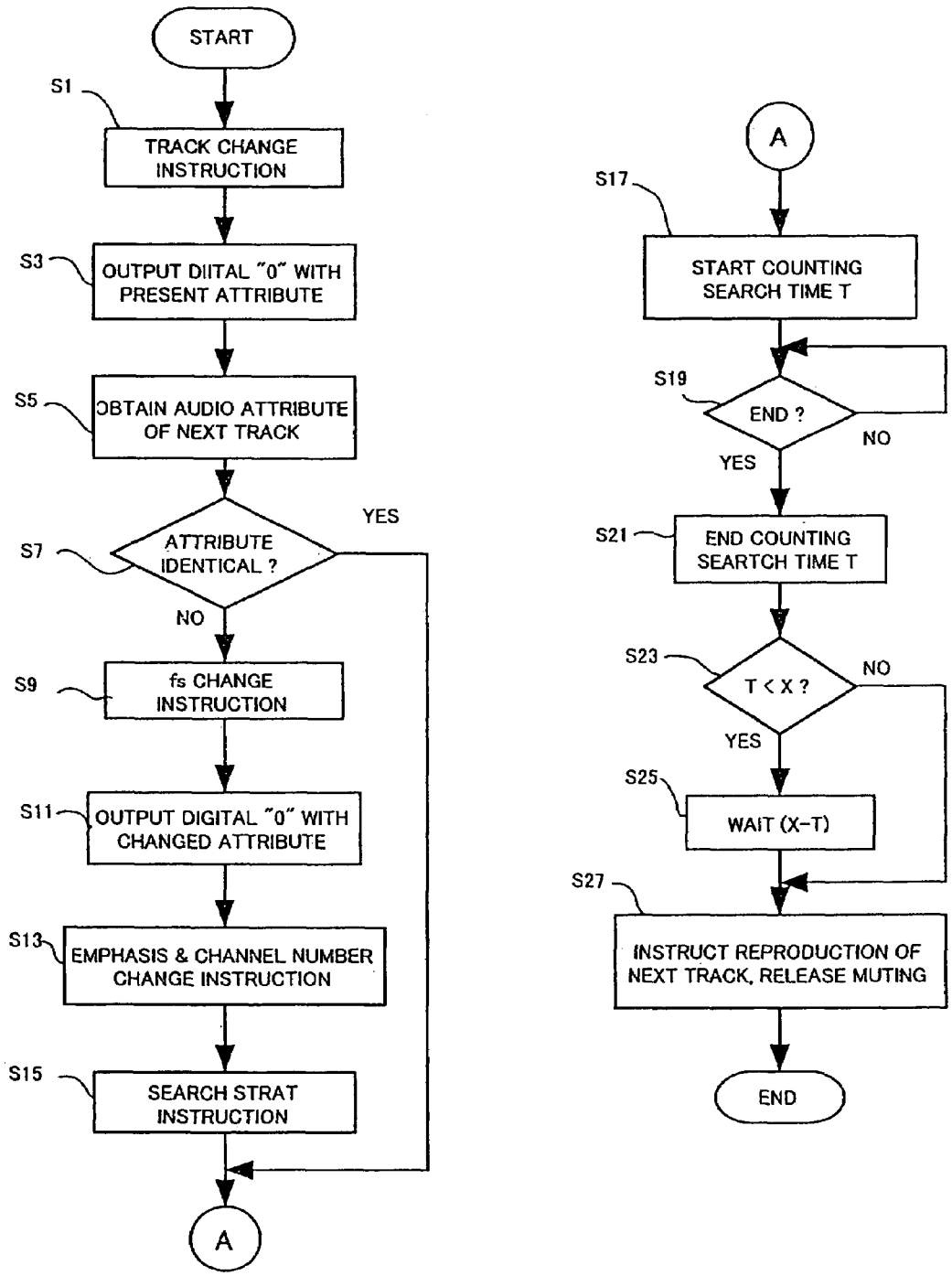

INFORMATION STORAGE MEDIUM WITH AGGREGATE ATTRIBUTE INFORMATION, AND APPARATUS FOR REPRODUCING THE SAME

BACKGROUND OF THE INVENTION

1. Field of the Invention

The present invention relates to an information storage medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information storage medium, and a reproduction apparatus for reproducing the information from the information storage medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position of each LD or the like, serving as a standard position. Thus, in case of the CD for example, other than a normal reproduction to reproduce the recorded information in the order of recording, various special reproductions are possible, such as a reproduction to extract and listen to only desirable music pieces out of a plurality of recorded music pieces, a reproduction to listen to the recorded music pieces in a random order and so on.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, it is impossible for a user to choose the language used in the subtitle on the screen (e.g., from subtitle of Japanese and the original language) in the case of watching a foreign movie recorded on a LD or to choose the voices of a song (e.g., from English voices or Japanese voices) in the case of listening to the music recorded on a CD.

Nowadays, apart from the above-mentioned conventional CD, it is proposed and developed a DVD which is an optical disc which disc size is identical to CD and which recording capacity is enhanced to be approximately ten times larger than that of CD. By recording the subtitles and/or voices of plural languages on the DVD, the user can select one of those plural languages to enjoy the interactive and variegated playback.

In the DVD, plural audio information of various attributes such as the coding mode, the sampling frequency, the quantization bit number, the number of channels, the emphasis added or not added and the like (hereinafter referred to as "audio attribute") may be recorded in a mixed manner on a single DVD.

However, when reproducing audio information of different audio attributes, the reproduction apparatus should perform appropriate reproduction in conformity with those different audio attributes. For example, when reproducing and outputting audio information from the speaker, it is required to convert digital audio information recorded on the DVD into analog audio information and then supply it to the amplifier and the speaker. In such a case, if two songs to be successively reproduced have different sampling frequencies (e.g., the first song has the sampling frequency of 48 kHz and the second song has the sampling frequency of 96 kHz), the reproduction apparatus recognizes the different sampling frequencies for the first time when it reads audio data of the second song, after the playback of the first song, and then starts the processing to change the clock frequency of the D/A converter from 48 kHz to 96 kHz. However, it takes some time for the PLL (Phase Locked Loop) circuit to lock-in the changed frequency, and hence the frequency change may not be completed before starting the playback of the second song, thereby resulting in an incorrect playback of the initial portion of the second song. Such a problem may take place not only for the sampling frequency but for the difference of other audio attributes such as the quantization bit number, the emphasis added or not added, and the like.

SUMMARY OF THE INVENTION

It is therefore an object of the present invention to provide an information storage medium from which recorded songs to be successively reproduced and having different audio attributes may be correctly and smoothly reproduced in conformity with the different attributes.

It is another object of the present invention to provide a recording apparatus for the above information storage medium, and a reproduction apparatus for the above information storage medium.

According to one aspect of the present invention, there is provided an information storage medium including: a plurality of unit audio information to be reproduced independently of each other; aggregate audio information each including one or more of the unit audio information; unit attribute information indicating attributes of the unit audio information included in the aggregate audio information; and aggregate attribute information including the unit attribute information corresponding to the aggregate audio information recorded on the storage medium.

In accordance with the information storage medium, the plurality of unit audio information and the aggregate audio information are recorded. In addition, the unit attribute information indicating attributes of the unit audio information is recorded, and further the unit attribute information for all aggregate audio information on the information storage medium is recorded as the aggregate attribute information. Therefore, by referring to the aggregate attribute information, the attributes of all the unit audio information may be readily and quickly obtained.

In one preferred feature, the aggregate attribute information may be recorded at a position on the storage medium which is read prior to any other portions. Therefore, the aggregate attribute information is read first when the information storage medium is set to a reproduction apparatus, thereby enabling the reproduction control based on the aggregate attribute information.

The aggregate attribute information may include information of at least a sampling frequency and a quantization bit number used to a coding of the unit audio information, and a channel number.

According to another aspect of the present invention, there is provided a reproduction apparatus for an information storage medium including: a plurality of unit audio information to be reproduced independently of each other; aggregate audio information each including one or more of the unit audio information; unit attribute information indicating attributes of the unit audio information included in the aggregate audio information; and aggregate attribute information including the unit attribute information corresponding to the aggregate audio information recorded on the storage medium, the apparatus including: a reading unit for reading information from the information storage medium; a storage unit for storing the aggregate attribute information read by the reading unit; an input unit for receiving, from a user, a reproduction instruction designating a plurality of unit audio information to be reproduced successively; and a reproduction unit for setting the attribute for the reproduction based on the aggregate attribute information stored in the storage unit and for reproducing the unit audio information designated by the user in accordance with the attribute set, wherein the reproduction unit including: an obtaining unit for obtaining the attribute corresponding to each of the plurality of unit audio information designated by the user from the aggregate attribute information stored in the storage unit; a determining unit for determining whether or not the obtained attributes of the unit audio information to be successively reproduced are identical; and an attribute change unit for starting an attribute setting of the unit audio information to be reproduced next immediately after the reproduction of the unit audio information currently reproduced, if the determining unit determines that the attributes are different.

According to similar aspect of the present invention, there is provided a reproduction method of an information storage medium including: a plurality of unit audio information to be reproduced independently of each other; aggregate audio information each including one or more of the unit audio information; unit attribute information indicating attributes of the unit audio information included in the aggregate audio information; and aggregate attribute information including the unit attribute information corresponding to the aggregate audio information recorded on the storage medium, the method including the steps of: reading the aggregate attribute information from the information storage medium to store the read information into a storage unit; receiving, from a user, a reproduction instruction designating a plurality of unit audio information to be reproduced successively; setting the attribute for the reproduction based on the aggregate attribute information stored in the storage unit; and reproducing the unit audio information designated by the user in accordance with the attribute set, wherein the reproducing step including the steps of: obtaining the attributes corresponding to each of the plurality of unit audio information designated by the user from the aggregate attribute information stored in the storage unit; determining whether or not the attributes of the unit audio information to be reproduced successively are identical; and starting an attribute setting of the unit audio information to be reproduced next immediately after the reproduction of the unit audio information currently reproduced, if it is determined in the determining step that the attributes are different.

In accordance with the apparatus and the method, first the aggregate attribute information is read out from the information storage medium and then is stored in the storage unit. Next, the user inputs the reproduction instruction designating a plurality of unit audio information to be reproduced successively. The attributes are set based on the aggregate attribute information stored in the storage unit, and the unit audio information designated by the user are reproduced in accordance with the attributes thus set. Specifically in the reproduction, the attribute for each of the unit audio information designated by the user is obtained from the aggregate attribute information in the storage unit, and then it is determined whether or not the attributes of the unit audio information to be successively reproduced are identical. If the attributes are different, the attribute of the unit audio information to be reproduced next is set immediately after the reproduction of the unit audio information currently reproduced.

Therefore, since the attribute of the unit audio information to be reproduced next can be obtained from the aggregate attribute information, the attribute change of the reproduction apparatus may be readily and quickly performed even if the attributes of the unit audio information to be successively reproduced are different and hence the attribute change is required in the reproduction apparatus.

According to still another aspect of the present invention, there is provided a reproduction apparatus for an information storage medium including: a plurality of unit audio information to be reproduced independently of each other; aggregate audio information each including one or more of the unit audio information; and unit attribute information indicating attributes of the unit audio information included in the aggregate audio information, the apparatus including: a reading unit for reading information from the information storage medium; a table producing unit for obtaining the unit attribute information corresponding to the aggregate audio information recorded on the storage medium from the reading unit and for producing an aggregate attribute information table; a storage unit for storing the aggregate attribute information table produced by the table producing unit; an input unit for receiving, from a user, a reproduction instruction designating a plurality of the unit audio information to be reproduced successively; and a reproduction unit for setting the attribute for the reproduction based on the aggregate attribute information table stored in the storage unit and for reproducing the unit audio information designated by the user in accordance with the attribute set, wherein the reproduction unit including: an obtaining unit for obtaining the attributes corresponding to each of the plurality of unit audio information designated by the user from the aggregate attribute information table stored in the storage unit; a determining unit for determining whether or not the obtained attributes of the unit audio information to be successively reproduced are identical; and an attribute change unit for starting an attribute setting of the unit audio information to be reproduced next immediately after the reproduction of the unit audio information currently reproduced, if the determining unit determines that the attributes are different.

In the similar aspect of the present invention, there is provided a reproduction method of an information storage medium including: a plurality of unit audio information to be reproduced independently of each other; aggregate audio information each including one or more of the unit audio information; and unit attribute information indicating attributes of the unit audio information included in the aggregate audio information, the apparatus including: reading the unit attribute information corresponding to the aggregate audio information recorded on the storage medium to produce an aggregate attribute information table; storing the aggregate attribute information table produced into a storage unit; receiving, from a user, a reproduction instruction designating a plurality of unit audio information to be reproduced successively; setting the attribute for the reproduction based on the aggregate attribute information table stored in the storage unit; and reproducing the unit audio information designated by the user in accordance with the attribute set, wherein the reproducing step including the steps of obtaining the attributes corresponding to each of the plurality of unit audio information designated by the user from the aggregate attribute information table stored in the storage unit; determining whether or not the attributes of the unit audio information to be successively reproduced are identical; and starting an attribute setting of the unit audio information to be reproduced next immediately after the reproduction of the unit audio information currently reproduced, if it is determined in the determining step that the attributes are different.

In accordance with the apparatus and the method, first the aggregate attribute information for all aggregate audio on the information storage medium is read out from the information storage medium and the aggregate attribute information table is produced and stored in the storage unit. Next, the user inputs the reproduction instruction designating a plurality of unit audio information to be reproduced successively. The attributes are set based on the aggregate attribute information table stored in the storage unit, and the unit audio information designated by the user are reproduced in accordance with the attributes thus set. Specifically in the reproduction, the attribute for each of the unit audio information designated by the user is obtained from the aggregate attribute information table in the storage unit, and then it is determined whether or not the attributes of the unit audio information to be successively reproduced are identical. If the attributes are different, the attribute of the unit audio information to be reproduced next is set immediately after the reproduction of the unit audio information currently reproduced.

Therefore, since the attribute of the unit audio information to be reproduced next can be obtained from the aggregate attribute information table, the attribute change of the reproduction apparatus may be readily and quickly performed even if the attributes of the unit audio information to be successively reproduced are different and hence the attribute change is required in the reproduction apparatus.

In a preferred embodiment, the reproduction unit may include a search unit for transferring the reading unit to a recording position on the information storage medium of the unit audio information to be reproduced next immediately after the reproduction of the unit audio information currently reproduced, and for allowing the reproduction unit to start reproduction of the unit audio information to be reproduced next after a predetermined waiting time has passed from the start of the transfer of the reading unit.

With this arrangement, when the reproduction of one unit audio information ends, the reading position is transferred to the recording position of the unit audio information to be reproduced next, and then the reproduction thereof is started. Therefore, if the attribute of the unit audio information to be reproduced next is different from that of the unit audio information unit currently reproduced, it is ensured that the reproduction is started after the appropriate attribute change is completed.

Preferably, the waiting time is longer than a time required to change the set attribute by the attribute change unit.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram showing contents of audio attribute information recorded in VTS;

FIG. 6 is a diagram showing contents of audio centralized information;

FIG. 10 is a flowchart showing a control for successive playback of songs.

DETAILED DESCRIPTION OF THE PREFERRED EMBODIMENTS

Referring to the accompanying drawings, preferred embodiments of the present invention will be now explained. The following explanations will be done for the embodiments, in which the present invention is applied to the aforementioned DVD.

In the following embodiments, constitutional elements listed on a right hand side in a following list respectively construct the examples of constitutional elements of the present invention listed on a left hand side in the following list.

Unit audio information: Track (corresponding to PGC)
Aggregate audio information: Group (corresponding to VTS)
Unit attribute information:
  Audio attribute information in each VTS
Aggregate attribute information:
  Audio attribute information in each audio centralized information

[I] Embodiment of Information Storage Medium (1) Physical and Logical Format of DVD First of all, a physical structure and a logical structure as well as an operation of a DVD, as one embodiment of the information storage medium to which the present invention is applied, will be explained with reference to FIGS. 1 to 6.

Figure 1:
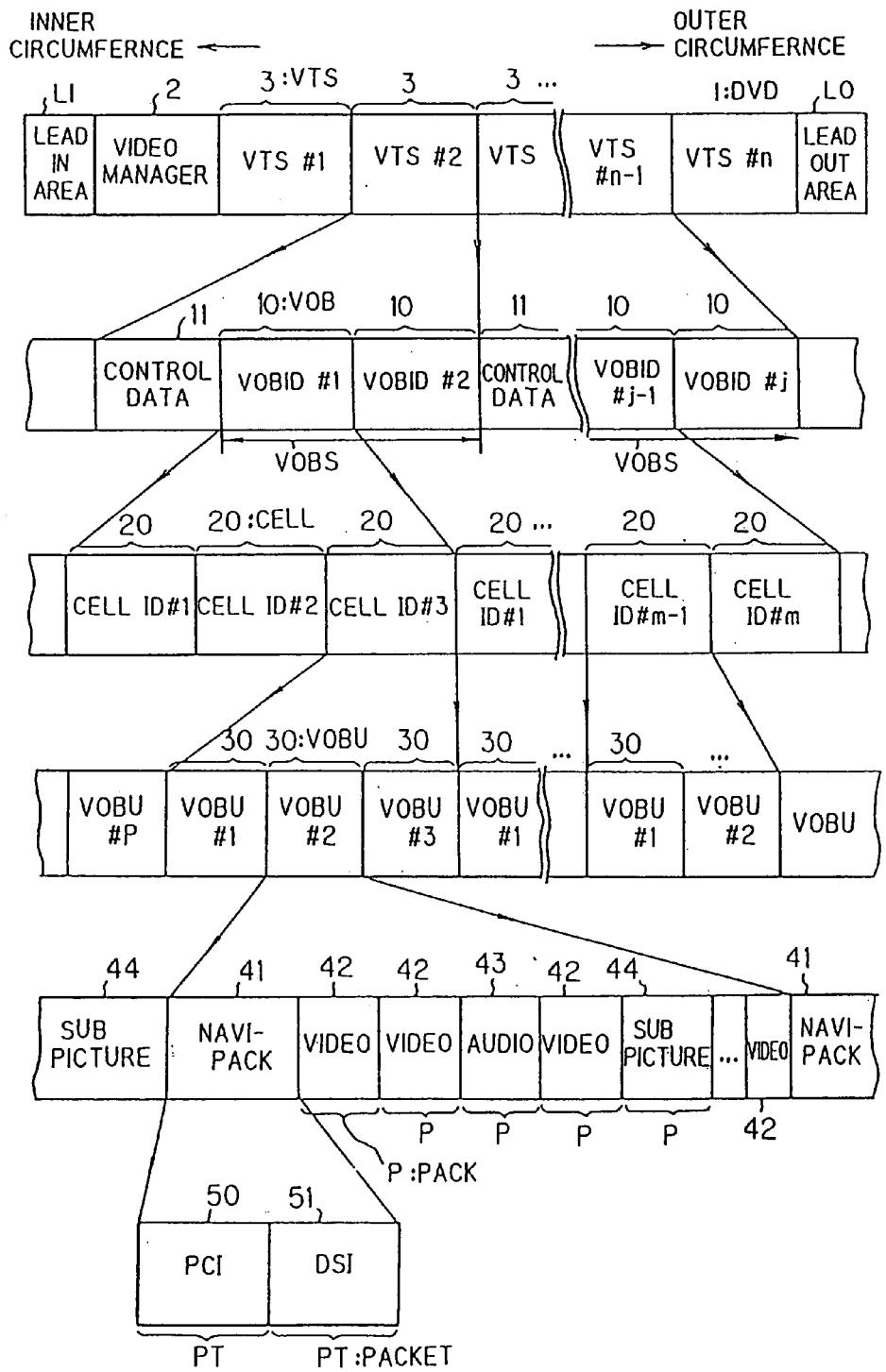
FIG. 1 is a diagram showing a physical structure of recorded information of a DVD according to the present invention.

At first, a recording format of video information and audio information, including music information, on the DVD (i.e. a physical record format) is explained by use of FIG. 1.

As shown in FIG. 1, a DVD 1 as the present embodiment is provided with a lead-in area LI at its most inner circumferential portion and a lead-out area LO at its most outer circumferential portion, between which video information and audio information are recorded such that they are divided into a plurality of VTSs (Video Title Set) 3, each of which has a unique ID (Identification) number (i.e. VTS#1 to VTS#n). Here, the VTS 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Inside of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed inside of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not stride over two VOBs 10.

One cell 20 is constructed of a plurality of VOB units (VOBUs) 30, each of which has an ID number (VOBU#1, VOBU#2, . . . ). Here, the VOB unit 30 is an information unit, each of which includes one of the video information, the audio information and sub picture information (which is defined as information of a sub picture such as a subtitle of a movie etc.), or alternatively includes only a navi-pack described later.

One VOB unit 30 is provided with: a navi-pack (a navigation pack) 41 for storing control information of video information included in the VOB unit 30; a video pack 42 including video data serving as video information; an audio pack 43 including audio data serving as audio information; and a sub picture pack 44 including sub-picture data serving as sub picture information. Here, only picture data is recorded as video data, and only sound data is recorded as audio data. In addition, only graphic data such as characters and diagrams serving as sub-picture is recorded as sub-picture data. It is prescribed by a standard specification of the DVD that there are 8 kinds of audio recordable on the DVD 1 while 32 kinds of sub picture recordable on the DVD 1.

The reproduction time for one VOB UNIT 30 (i.e., the reproduction time corresponding to data recorded between a navi-pack 41 and the next navi-pack 41 neighboring thereto) is equal to or longer than 0.4 second.

Further, there always exists the navi-pack 41 in one VOB UNIT 30. On the other hand, there may not exist each of the video pack 42, the audio pack 43 and the sub picture pack 44 in one VOB UNIT 30, or, even in case that these packs exist in one VOB UNIT 30, the number of the packs and the order of the packs may be arbitrarily determined.

The respective divisions of the video pack 42, the audio pack 43 and sub-picture pack 44 are generally referred to as "pack P". Namely, the video data, the audio data and the sub-picture data are recorded in one VOB unit 30 in a manner divided into the respective packs P. Those packs are the recording units which are determined in accordance with the pack processing of MPEG2 system, the MPEG2 system being used for recording information onto the DVD 1 according to an embodiment of the present invention.

Further, the pack header recorded at the leading position of each pack P includes reading start time information and start code. The reading start time information indicates the reading start time on the playback time axis, at which data included in the respective packs P should be read out from the track buffer (described later) in the reproduction apparatus to be supplied to the respective buffers, and is called as System Clock Reference. The start code indicates the beginning of the pack P. In each pack P, normally the video data, the audio data and the sub-picture data are recorded as packets which are the sub-divided recording units of the pack P. In the DVD 1 according to the embodiment of the present invention, one pack P generally is constructed by one packet.

Finally, the navi-pack 41 is provided with: a DSI (Data Search Information) data 51 including search information to search video image desired to be displayed or audio sound desired to be outputted (concretely, search information such as an address on the DVD 1 where the video or audio information to be displayed or outputted is recorded); and a PCI (Presentation Control Information) data 50 including information related to a display control at the time of displaying the video image or outputting the audio sound, which is searched on the basis of the information of the DSI data 51. The DSI data 51 and the PCI data 50 are recorded to form the DSI packets and the PCI packets, respectively, as the packets PT.

Further, all video packs 42 included in one VOB unit 30 consist of at least one GOP (Group Of Pictures). The GOP is a minimum image unit, reproducible by itself, determined in the standard of MPEG2 (Moving Picture Experts Group 2) which is employed for recording video image information on the DVD 1 according to the embodiment of the present invention.

In the above explained recording format having a hierarchical structure as shown in FIG. 1, each division can be freely set according to the intention of the author, who produces information to be recorded on the DVD 1, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. It is noted that the information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

Figure 2:
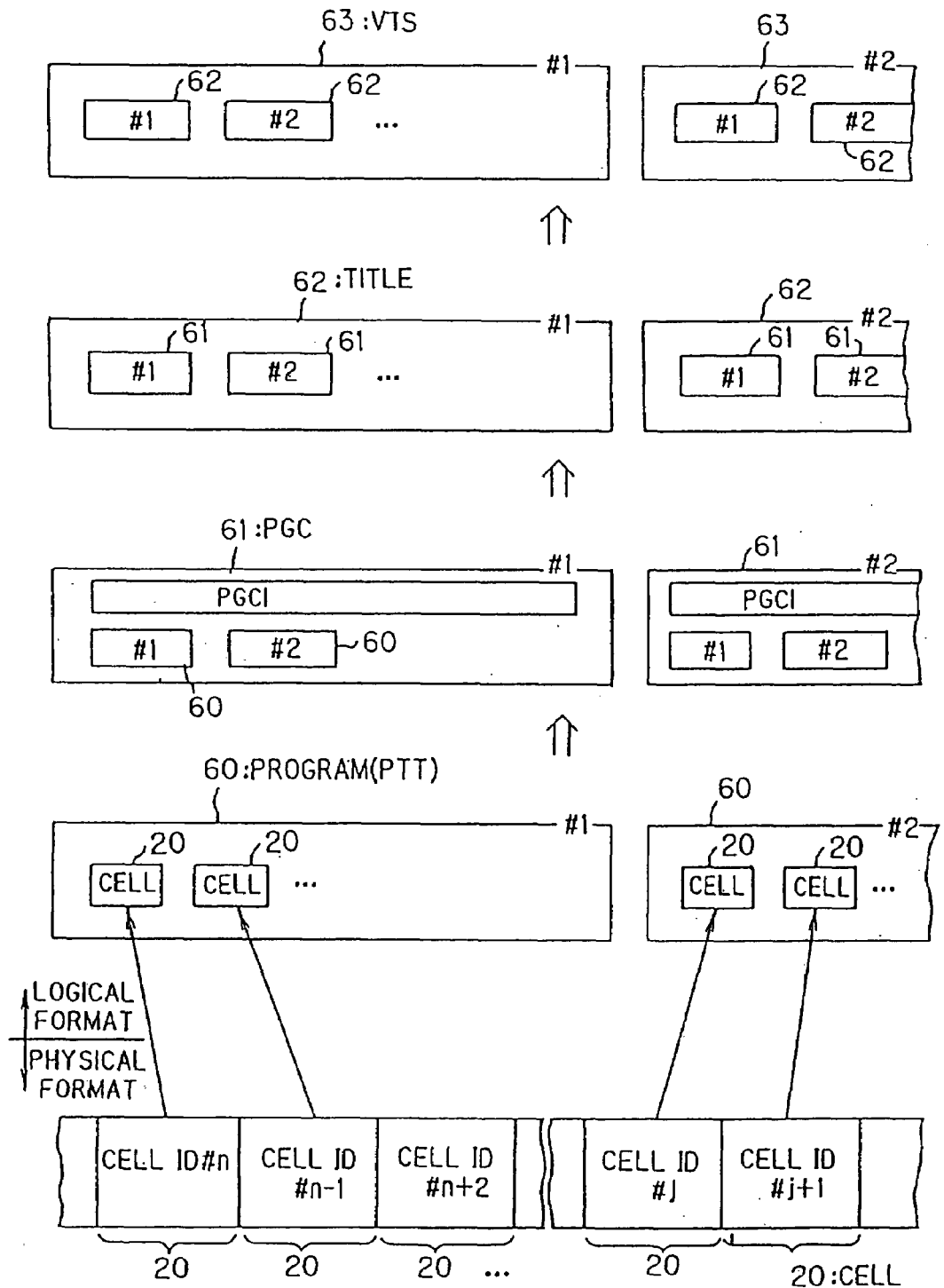
FIG. 2 is a diagram showing a logical structure of recorded information of a DVD according to the present invention.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproduction apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Figure 4:
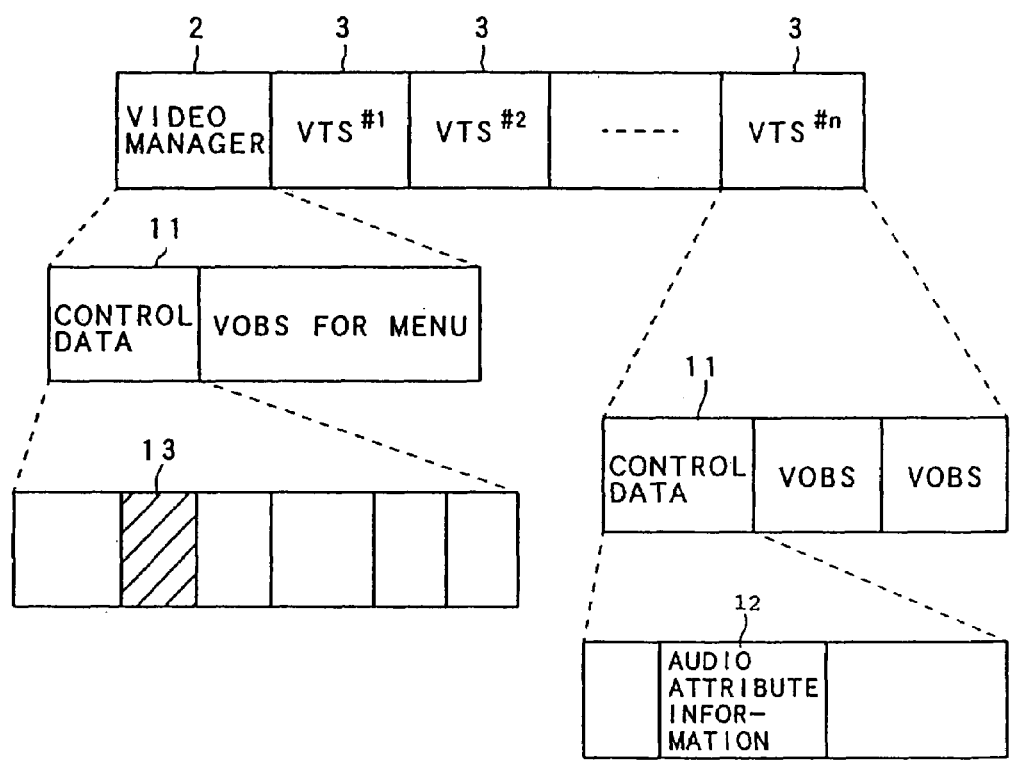
FIG. 4 is a diagram showing an example of a recording manner of audio attribute information and audio centralized information.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a recording position of each cell 20 on the DVD 1; the number of the cell 20 positioned at the head of one program 60 to be firstly reproduced; a reproduction method for each program 60; and various commands (e.g. commands able to be specified by the author for each PGC 61 or each cell 20). The recording position of the PGCI on the DVD 1 may be in the control data 11 (see. FIG. 1) as aforementioned, or in the control data (see. FIG. 4) in the video manager 2 if the pertinent PGCI is related to the menu in the video manager 2.

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ). The title 62 included in the VTS 63 has the attributes common to each other. For example, the movies based on one movie but in different languages or plural music albums of a music artist correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image or music for the audience to watch is to be formed.

Since it is necessary to record information of various hierarchical layers, information according to the above-mentioned recording format is quite suitable for the DVD in which, in recording a movie, not only the information of the movie itself but also the sounds and/or subtitles, for various languages, of the movie are recorded on a single disk.

(2) Contents of Audio DVD

As mentioned above, video information, character information and audio information may be recorded on the DVD in a mixed manner. When recording a movie on the DVD, the video information and the audio information are recorded in pair with each other, and, if necessary, subtitles or the like are additionally recorded as the sub-picture information. Alternatively to this, only audio information may be recorded on the DVD like a CD, and in that case no video information is basically recorded. A DVD of this type will be hereinafter referred to as "Audio DVD". In this case, more specifically, the VOB unit 30 shown in FIG. 1 includes the navi-packs 41 and the plural audio packs 43, but does not include any video pack and sub-picture pack, although a little amount of video information, such as character information for use in selecting songs or introduction of songs or advertisement, may be recorded. The present invention is particularly related to audio information, and it is assumed in the following description that only audio information is recorded on the DVD.

Prior to the description of the embodiment of the present invention, a rough description will be given of the recording manner of audio information on the audio DVD. The audio DVD has a recording capacity much larger than that of a CD, and a unique DVD can record music information corresponding to a plurality of CDs. Here, it is assumed that an aggregation of audio information corresponding to one CD is called as "group". For example, it is assumed that there is an audio DVD on which plural original albums (e.g., four) of the Beatles such as "LET IT BE", "ABBEY ROAD", . . . are recorded. Audio information corresponding to the plural albums are recorded on the DVD as individual title sets (VTS 3 in FIG. 1). For example, "LET IT BE" is recorded in the VTS #1, and "ABBEY ROAD" is recorded in the VTS #2. In such case, the aggregation of audio information, each corresponding to one album, constitutes a "Group".

While one album corresponds to one Group in the above example, it is possible to constitute a Group by an aggregation of audio information collected based on a certain theme or concept. For example, a collection of songs that John Lennon takes the lead vocal, named "John Lennon Vocal Collection" (e.g., VTS #5), and a collection of songs that Paul McCartney takes the lead vocal, named "Paul McCartney Vocal Collection" (e.g., VTS #6), may be recorded in addition to the above original albums of Beatles, and those collections also constitute the Groups corresponding to one VTS, respectively. However, in that case in fact, the songs included in the above original albums are reproduced, and the same songs that are recorded in the original albums are not recorded in the VTS#5 or VTS#6 in the duplicated manner. Therefore, only the reproduction control information, such as address and attributes, of audio information recorded in the VTS#1, #2 are recorded in the VTS#5 and VTS#6. The reproduction of the songs belonging to VTS#5, #6 are performed by reproducing the substantial audio information recorded in the VTS#1, #2 in accordance with the reproduction control information recorded in the VTS#5, #6. It is noted that such an aggregation of audio information collected based on a certain theme or concept is referred to as a "Collection". Therefore, the Collection is a group including the substantial information that is recorded in other Group (VTS).

It is possible to understand that the Group corresponds to the aggregation of songs that a user recognizes. In the above mentioned example, four original albums and two Collections are recorded on a DVD. In this case, the contents list attached to the DVD indicates that the DVD includes 6 different albums. In fact, the substantial information of the two Collections are constituted by the substantial information recorded in the four original albums, and no substantial audio information is recorded for multiple times in the duplicated manner. However, the user does not recognize such thing and simply thinks that the DVD includes 6 different albums. Therefore, in spite of the recording manner of the substantial audio information on the DVD, the Group may be regarded as an aggregation of songs that the user can recognize.

(3) Audio Attribute Information

Next, audio attribute information recorded on the DVD will be described. Audio attribute information indicates the attributes of audio information recorded on the DVD, and specifically includes the coding mode, the sampling frequency, the quantization bit number, the channel number, and application of emphasis. In the present invention, the audio attribute information is recorded in the audio pack 43, the control data 11 in the VTS 3 and the control data in the video manager 2. This will be described in more detail.

Figure 3:
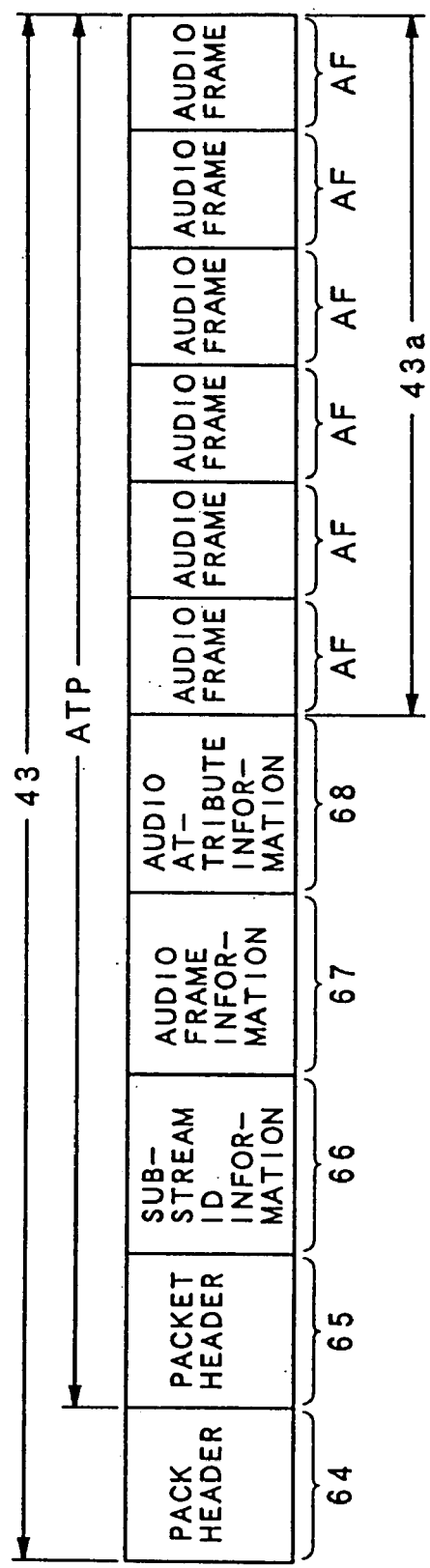
FIG. 3 is a diagram showing an example of a structure of an audio pack.

As described above, the audio information is recorded in the audio pack 43, and the audio attribute information is firstly recorded in the audio pack 43. FIG. 3 shows the contents of the audio pack 43. The audio information is classified into two types, i.e., a first type in which compressed audio data is recorded and a second type in which non-compressed audio data such as linear PCM data is recorded. Here, the audio information of the second type is exemplified. Namely, FIG. 3 shows the contents of the audio pack 43 in which the audio data of liner PCM coding mode is recorded.

As shown, the audio pack 43 is constituted by a pack header 64 and an audio packet APT. The pack header 64 includes reading start time information which is control information used at the time of reproducing data in each pack P and a start code indicating the beginning of the pack P. In addition, the audio packet APT includes a packet header 65 including information indicating that the data in the audio pack 43 is audio data, sub-stream ID information 66 including information indicating whether the audio data in the audio pack 43 is compressed audio data or non-compressed audio data such as the linear PCM data, and audio frame information 67 including audio frame number information.

Further, the audio pack 43 includes the audio attribute information 68 related to the attributes of the audio data in the audio pack 43. In the case of the linear PCM data, the audio data attribute information 68 includes the sampling frequency, the quantization bit number, channel number of audio data (one channel is constituted by audio data outputted from one speaker, and the channel number is "2" when audio data for left and right speakers are recorded), and the application of emphasis to the audio data. The audio pack 43 further includes audio data 43*a* which is the substantial audio information portion and is constituted by a plurality of audio frames AF. In the above mentioned data structure, the portion of the audio pack 43 except for the pack header 64 constitutes the audio packet APT.

The audio attribute information is also recorded in the control data 11 of each VTS. FIG. 4 shows the audio attribute information 12 in the control data 11. As illustrated, for all VTSs, the audio attribute information of the audio information in the VTS is recorded in its control data 11. FIG. 5 shows an example of the audio attribute information 12. As shown in FIG. 5, the audio attribute information 12 includes a coding mode 15*h* of the audio information, multi-channel information 15*i*, an audio type 15*j*, an application type 15*k*, a quantization bit number 15*m*, a sampling frequency 15*n*, a channel number 15*o*, and an emphasis 15*p*. The coding mode 15*h* prescribes the coding mode of audio data, such as Dolby-AC3, linear PCM and the like, and the audio type 15*j* prescribes whether or not the audio information includes words (e.g., words-of-song). The application type 15*k* indicates, if the audio information is of multi-channels, the usage of the multi-channel data, and includes karaoke, surround and the like. The quantization bit number 15*m* and the sampling frequency 15*n* indicate the quantization bit number and the sampling frequency in coding the audio information, respectively. The channel number 15*o* indicates the channel number of the audio information, and the emphasis 15*p* indicates whether or not the emphasis is applied to the audio information.

Further, the audio attribute information is also recorded in the control data in the video manager 2 as a part of audio centralized information 13. FIG. 6 shows an example of the audio centralized information 13. As seen in FIG. 6, the audio centralized information 13 in the control data 11 of the video manager 2 includes an aggregation of audio management information described in the control data 11 of each VTS. In the example of FIG. 6, the DVD includes three Groups, and each Group corresponds to one VTS. As mentioned above, the Group corresponds to one album such as a CD, and the user recognizes that the DVD includes three different albums. The track corresponds to a song. The Group-3 in FIG. 6 corresponds to the above-mentioned "Collection". Namely, while the user recognizes the Group-3 as a group different from the Group-1 and Group-2, the Group-3 is an aggregation of the substantial audio data collected according to a certain theme or concept and are, in fact, recorded in the Group-1 and Group-2.

The audio centralized information 13 further includes the start and end addresses of the tracks, which are the absolute addresses on the DVD. Further, the audio centralized information 13 includes, as the audio attribute information, at least the sampling frequency, the quantization bit number, the channel number and the emphasis, which are essential for the reproduction of the audio information, from the audio attribute information 12 recorded in the control data 11 of each VTS as mentioned. The audio centralized information 13 further includes the playback time of each track and the total playback time of each Group, which are used for the playback time management.

In this manner, each Group (VTS) includes the audio attribute information 12 in the control data 11 and the reproduction of the songs in the Groups are enabled by referring to the attribute information 12. However, in order to obtain the audio attribute information 12, it is necessary to access to the control data 11 in the VTS to read out the contents. Since audio information of different attribute can be recorded in different VTSs on the DVD, it is likely that plural songs of different attributes, belonging to the different Groups, are successively reproduced. Firstly, this may take place if the user choose the songs of different Groups by his manual selection operation of songs to be reproduced. Alternatively, this may also take place when reproducing the Group called "Collection" such as the Group-3 in FIG. 6, because the Collection includes the substantial audio information which are actually recorded in other Groups and hence generally includes tracks of different attributes in a mixed manner.

In such case, since the audio attribute such as the sampling frequency, the quantization bit number, and so on changes as the reproduction of the songs goes on, the reproduction apparatus needs a certain period of time in which to adapt itself to such change. When reproducing the songs of different attribute successively, if the audio centralized information 13 is not prepared and recorded in the video manager 2, the reproduction apparatus in no way recognize the attribute change until it searches the audio attribute information in the VTS corresponding to the Group including the next track and then obtains the attribute of the next song. Therefore, if the search or track jump to the next song (i.e., the pickup movement) is completed in relatively short time period, the reproduction of the next song begins before the reproduction apparatus recognizes the attribute change and complete the necessary adaptation such as the change of the sampling frequency, thereby disabling the correct reproduction of the initial part of the next song. Normally the reproduction apparatus is not designed to notify the completion of the adaptation such as the change of the sampling frequency to the controller that controls reading the DVD, and hence such an undesirable situation may likely take place.

In this view, in the present invention, the audio management information in the control data 11 of each VTS is aggregated and then recorded in the video manager 2 as a part of the audio centralized information 13. When the DVD is set to the reproduction apparatus, the audio centralized information 13 in the video manager 2 is read out and stored in a memory within the controller of a reproduction apparatus. By this, when audio information of different audio attribute is successively reproduced like the case of reproducing Collection, the audio attribute of the song to be reproduced next can be obtained, in advance, by referring to the audio attribute information in the audio centralized information 13. This may overcome the above mentioned problem in successively reproducing songs of different attributes. The actual operation of the reproduction apparatus will be described later in detail.

[II] Embodiment of Recording Apparatus

Next, an embodiment of recording apparatus for recording the above mentioned audio centralized information including the audio attribute information onto the DVD 1 will be explained with reference to FIG. 7. At first, a construction and an operation of the recording apparatus as the embodiment is explained with reference to FIG. 7.

Figure 7:
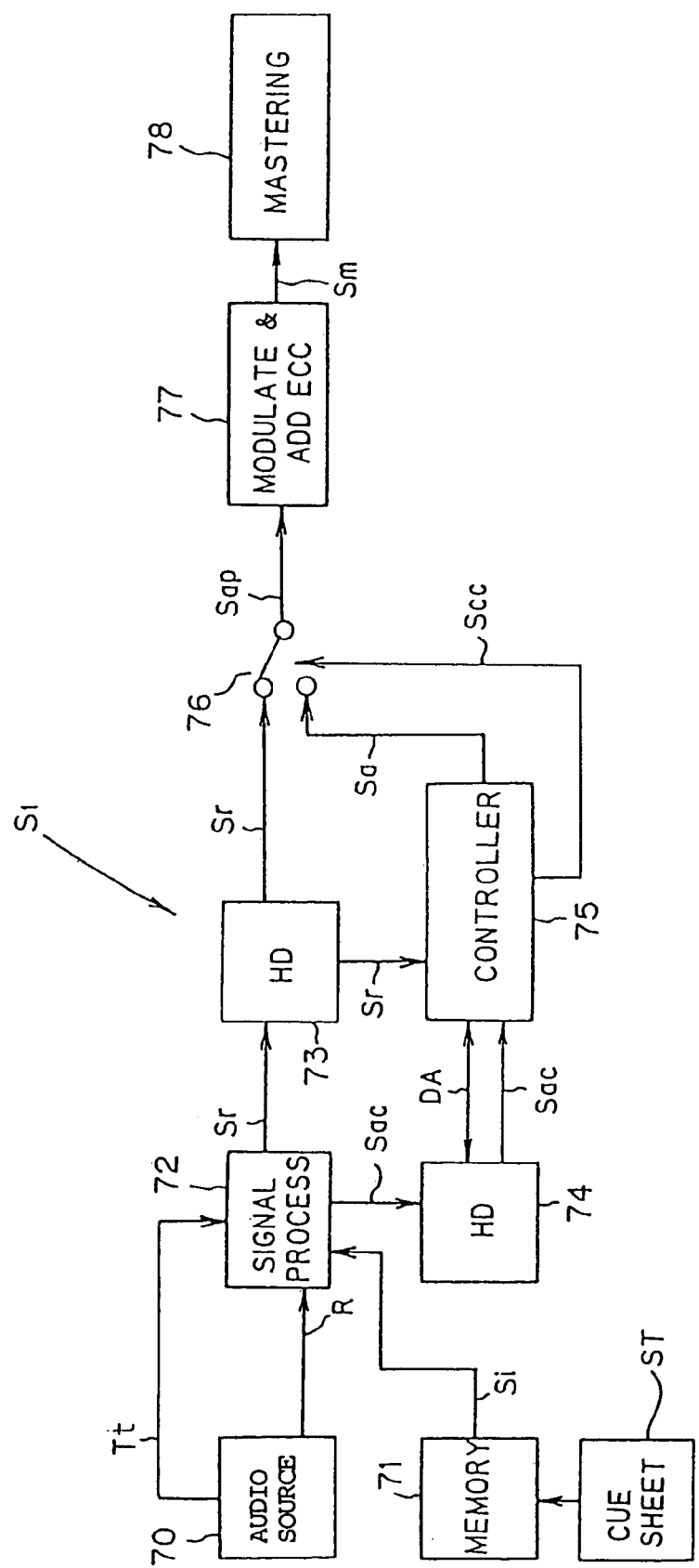
FIG. 7 is a block diagram schematically showing a configuration of an information recording apparatus for a DVD according to the present invention.

As shown in FIG. 7, a recording apparatus S1 as the present embodiment is provided with: an audio source 70; a memory 71; a signal processing unit 72; a hard disk (HD) device 73; a hard disk (HD) device 74; a controller 75; a multiplexer 76; a modulator 77; and a mastering device 78.

Nextly, an operation of the present embodiment will be explained.

Recording information R, which is a material of audio information to be recorded on the DVD 1, is temporarily recorded in the audio source 70 in a manner divided into each information unit. Then, the recording information R temporarily recorded in the audio source 70 is outputted to the signal processing unit 72 by a request from the signal processing unit 72.

The signal processing unit 72 applies an A/D (Analog to Digital) converting process and a signal compressing process to the recording information R outputted from the audio source 70, applies an compression if necessary, and then outputs it as an audio signal Sr. After that, the audio signal Sr outputted therefrom is temporarily stored into the hard disk device 73.

Along with this, the memory 71 temporarily stores the control information which is inputted beforehand on the basis of a cue sheet ST, on which the control information for controlling the reproduction of the recording information R (e.g., the control information of the pack headers for constituting the video manager 2, the control data 11, the navi-packs 41 and the respective audio packs 43 shown in FIG. 1) is recorded. Then, the memory 71 outputs it as a control information signal Si on the basis of a request from the signal processing unit 72.

Then, the signal processing unit 72 generates and outputs an access information signal Sac corresponding to the audio information Sr with referring to a time code Tt, on the basis of the time code Tt corresponding to the recording information R outputted from the audio source 70 and the control information signal Si outputted from the memory 71. Then, the access information signal Sac is temporarily stored in the hard disk device 74. The above described process is performed for the whole recording information R.

When the above described process is finished as for the whole recording information R, the controller 75 reads out the audio signal Sr from the hard disk device 73, reads out the access information signal Sac from the hard disk device 74, generates additional information Da on the basis of these read out signals, and stores the additional information Da into the hard disk device 74 as the additional information Sa. The concrete contents of the audio centralized information 13 and the audio attribute information 12 according to the present invention has been determined in advance, for each VTS by the Group (VTS) unit, by the producer of the DVD 1, and is recorded in the hard disk 74. By the control of the signal processing unit 72, the audio centralized information 13 and the audio attribute information 12 are included in the additional information Da. Namely, the audio attribute information 68 (see. FIG. 3) is included in the additional information Da as information to be recorded in each audio pack, the audio attribute information 12 (see. FIG. 4) is included in the additional information Da as information to be recorded in the control data 11 in each VTS 3. In addition, the audio centralized information 13 (see. FIG. 6) is included in the additional information Da as information to be recorded in the video manager 2.

On the other hand, the controller 75 performs a time management for each of the operations of the signal processing unit 72, the hard disk device 73 and the hard disk device 74, and reads out the additional information Da from the hard disk device 74, so that the controller 75 generates and outputs an additional information signal Sa corresponding to the read out additional information Da, and generates and outputs an information selection signal Scc to time-axis-multiplex the audio signal Sr and the additional information signal Sa.

After that, the audio signal Sr and the additional information signal Sa are read out from the hard disk devices 73 and 74, time-axis-multiplexed by the multiplexer 76 based on the information selection signal Scc, and then outputted as an information added compressed multiplexed signal Sap. In the stage of the information added compressed multiplexed signal Sap, the information to be recorded has the physical structure (physical format) shown in FIGS. 1 and 4 as the result of the multiplexing of the control information and the audio information by the switching operation according to the information selection signal Scc from the controller 75. In addition, each audio pack 43 has the data structure shown in FIG. 3.

Then, the modulator 77 adds an error correction code (ECC), such as a Reed Solomon code, and applies a modulation such as an eight to sixteen (8-16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

By the above-described operation, there is produced a DVD disk which includes the audio attribute information 68 in the audio pack 43, the audio attribute information 12 in the control data 11 of each VTS and the audio centralized information 13 in the video manager 2.

[III] Embodiment of Reproduction Apparatus (1) Reproduction Apparatus

Next, an embodiment of reproduction apparatus for reproducing the information recorded on the DVD 1 by the above mentioned recording apparatus will be explained with reference to FIGS. 8 and 9.

At first, a construction and an operation of the reproduction apparatus as the embodiment is explained with reference to FIG. 8.

Figure 8:
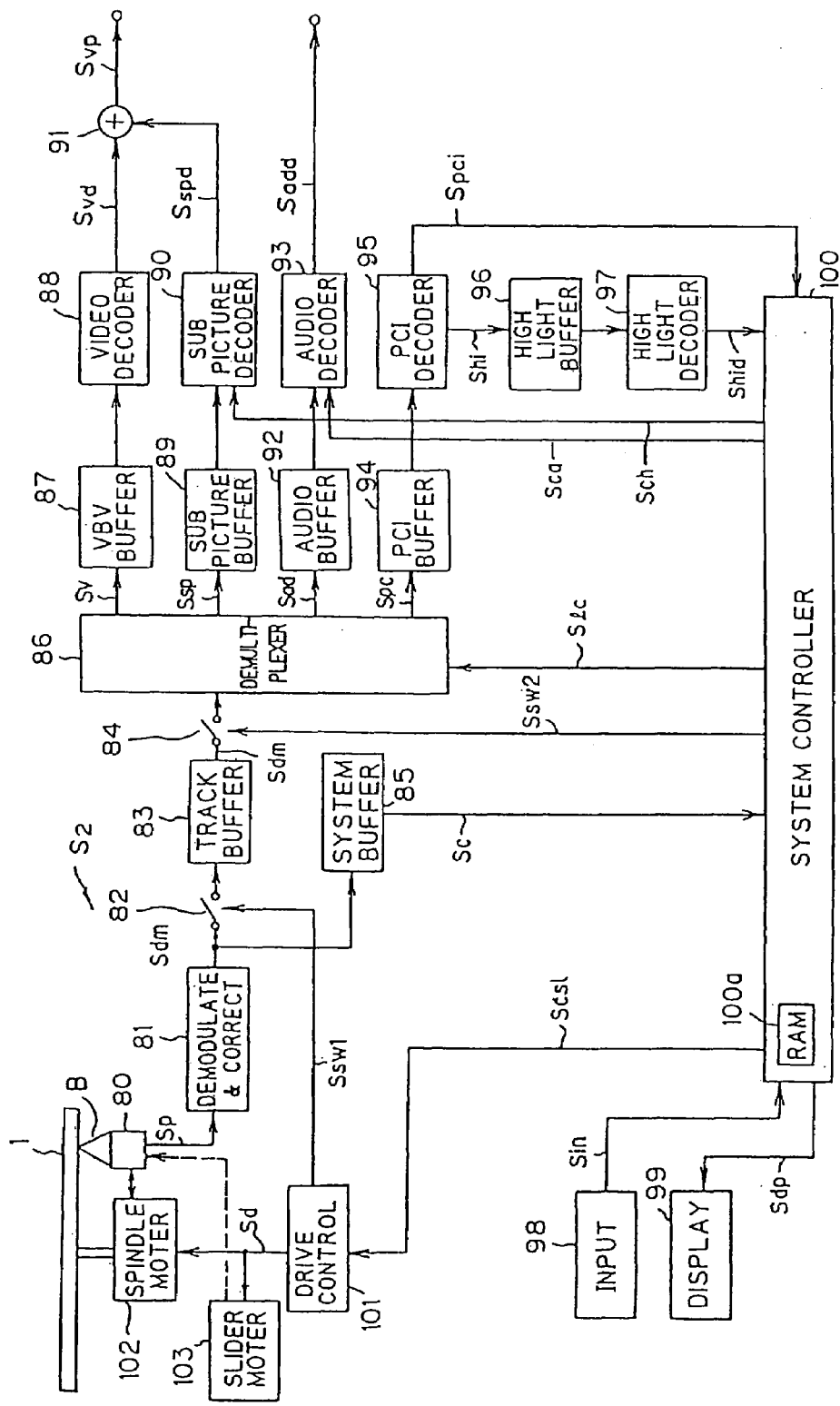
FIG. 8 is a block diagram of schematically showing a configuration of an information reproduction apparatus for a DVD according to the present invention.
Figure 9:
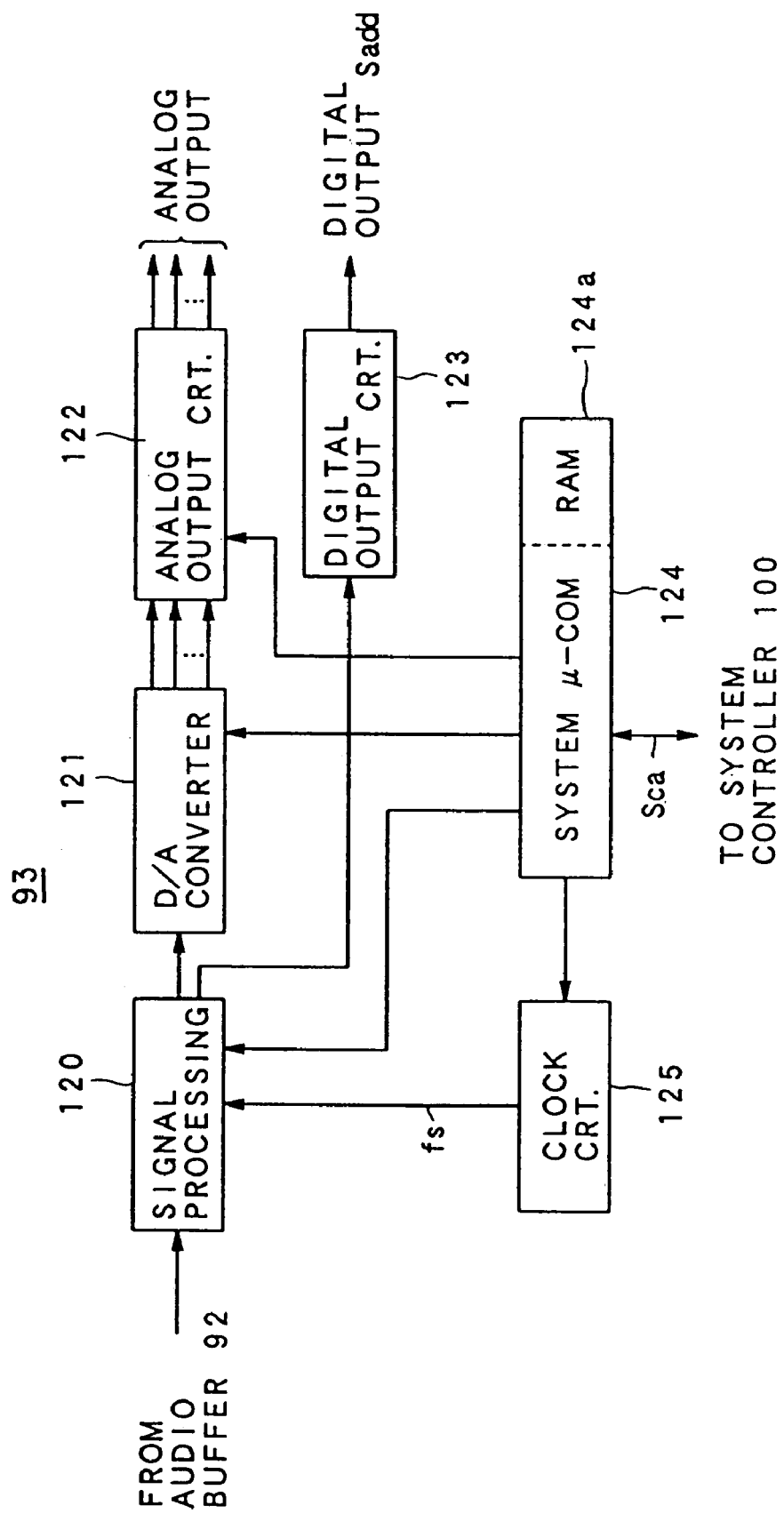
FIG. 9 is a block diagram schematically showing a configuration of an audio decoder shown in FIG. 8.

As shown in FIG. 8, a reproduction apparatus S2 according to the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 8 only illustrates the portions related to the video and audio reproduction of the reproduction apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode (not shown), a beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm to the track buffer 83 as it is. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates for a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 as the occasion demands while reproducing the information, to output it also as the control information Sc.

The demultiplexer 86, to which the demodulation signal Sdm is continuously inputted through the stream switch 84, separates the video data, the audio data, the sub picture data and the PCI data 50 for each navi-pack 41, respectively, from the inputted demodulation signal Sdm, and outputs them as a video signal Sv, a sub picture signal Ssp, an audio signal Sad and a PCI signal Spc to the VBV buffer 87, the sub picture buffer 89, the audio buffer 92 and the PCI buffer 94, respectively.

The demultiplexer 86 extracts the pack header 64 and the packet header 65 from each pack (including audio pack 43) and the packet (including audio packet APT), and outputs respective information to the system controller 100 as the header signal Shd. The header signal Shd includes the pack header 64, the packet header 65, the sub-stream ID information 66, the audio frame information 67 and the audio data information 68 of the audio pack 43, which are separated in the demultiplexer 86.

The audio signal Sad includes the audio data 43a which is divided into the audio packs 43 shown in FIG. 3, and each audio packs 43 includes the audio frames AF as shown in FIG. 3.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated for, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information on the basis of the header control information Shc outputted by the system controller 100, and delays the audio signal Sad in accordance with the output condition of the corresponding video information. Then, the audio signal Sad, which is time-adjusted to synchronize with the corresponding video information, is outputted to the audio decoder 93. Then, a reproduction processing of the linear PCM system is applied to the audio signal Sad based on the header control signal Shc outputted by the system controller 100, and the resultant signal is outputted as a decoded audio signal Sadd to a speaker etc. not illustrated. It is noted that, in the audio DVD including only audio information, the synchronization with the video information is unnecessary. The processing conducted in the audio decoder 93 will be described later in detail.

If it is detected by the system controller 100 that it is necessary to temporarily stop (pause) the audio voice in the reproduction immediately after an access to desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data, which is included in the PCI signal Spc, with the video data, the audio data and the sub picture data corresponding to the PCI data, and apply the PCI data to the video data and the like. Then, from the PCI signal Spc, which is synchronized with the corresponding the video data and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item (selection button), which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The demodulated high light signal Shid includes the aforementioned information to set the register in the system controller 100.

The system controller 100 outputs the high light control signal Sch on the basis of the demodulated high light signal Shid, in order to change the display condition of the high light information. At this time, the system controller 100 receives the selection by the input signal Sin from the input unit 98 and outputs the high light control signal Sch on the basis of the effective period information which indicates the effective period of the high light information included in the demodulated high light signal Shid, so that the selection operation using the menu screen based on the high light information is enabled.

On the basis of the control information Sc inputted from the system buffer 85, the header signal Shd inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, the stream selection signal Slc, the header control signal Shc, the pause signal Sca and the high light control signal Sch to correctly perform the reproduction corresponding to those input signals, and also outputs a display signal Sdp to display an operation condition etc. of the reproduction apparatus S2 to the display unit 99 such as the liquid crystal device.

Further, the system controller 100 outputs a seamless control signal Scsl corresponding to the track jump process, to the drive controller 101, when it detects by the DSI information signal Sdsi that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 8), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

(2) Audio Decoder

Next, the configuration and the operation of the audio decoder 93 which is particularly relevant to the present invention will be described. FIG. 9 shows the configuration of the audio decoder 93. As shown, the audio decoder 93 is provided with a signal processing unit 120 including digital filters, a D/A converter 121, an analog output circuit 122 including amplifiers, a digital output circuit 123, a system microcomputer 124 including a RAM 124a, and a clock circuit 125.

The system microcomputer 124 exchanges the control signal Sca with the system controller 100 to control the performance of the clock circuit 125, the signal processing unit 120, the D/A converter 121 and the analog output circuit 122. The system microcomputer 124 has the RAM 124a in its inside. The RAM 124a temporarily stores the audio attribute information which is supplied from the system controller 100 as the control signal Sca.

The system microcomputer 124 refers to the audio attribute information stored in the RAM 124a, and supplies the contents thereof to the clock circuit 125 and the signal processing unit 120. Specifically, the system microcomputer 124 supplies the sampling frequency information in the audio attribute information to the clock circuit 125. The clock circuit 125 has an oscillator, and supplies the clock signal fs corresponding to the designated sampling frequency to the signal processing unit 120. In addition, the system microcomputer 124 supplies information of the sampling frequency, the quantization bit number, the channel number, the application of emphasis, which are included in the audio attribute information, to the signal processing unit 120, and supplies the channel number information to the D/A converter 121. Further, the system microcomputer 124 supplies information such as the amplitude level of signals of the respective channels to the analog output circuit 122. The amplitude information for each channel may be included in the audio attribute information and supplied from the system controller 100.

The signal processing unit 120 utilizes the clock signal fs from the clock circuit 125 to perform the processing including the decoding and band-limiting of the audio signal from the audio buffer 92 in accordance with the information, from the system microcomputer 124, such as the coding mode (the linear PCM or DOLBY-AC3), the sampling frequency and the quantization bit number. Further, the signal processing unit 120 performs the de-emphasis processing based on the information of the application of emphasis and outputs the resultant signal to the D/A converter 121. The D/A converter 121 divides the inputted signal into the plural channels in response to the channel information obtained from the system microcomputer 124, and then outputs the divided signals to the analog output circuit 122 as the analog signals of the respective channels. The analog output circuit 122 applies appropriate amplification onto the signals of the respective channels to output them to speakers (not shown) as the analog audio signals. Further, the signal processing unit 120 outputs the digital audio signal Sadd to external via the digital output circuit 123.

Next, the performance of the audio decoder 93 at the time of reproduction will be described. When the track (i.e., song) to be reproduced next is designated, the reproduction apparatus S2 refers to the audio attribute information in the audio centralized information 13 of the video manager 2 to control the operation in the audio decoder 93 according to the audio attribute information of the designated track. As shown in FIG. 6, the address information on the DVD of the recording position of each track is also recorded in the audio centralized information 13 of the video manager 2. Accordingly, the system controller 100 supplies the control signal Scs1 to the drive controller 101 based on the address information (start address) to transfer the pickup 80 to the position of the start address. This process commences immediately after the user's playback instruction of the track, i.e., timely in parallel with the above mentioned control performed in the audio decoder 93.

After transferring the pickup 80 to the position of the start address of the designated track, the system controller 100 temporarily makes the pickup 80 at a pause state. Namely, the start of the reading information is deferred. This is required to ensure that the reading information (i.e., reproduction of the track) is started after the audio attribute setting is completed. The time required for the system controller 100 and the system microcomputer 124 in the system controller 100 to set the audio attribute in the audio decoder 93 is approximately the same between the same reproduction apparatuses. However, the time required for an external digital amplifier and a D/A converter to lock in the digital output signal from the digital output circuit 123 varies from device to device, and the time is normally about 1 or 2 seconds and not longer than 5 seconds. The time required to transfer the pickup 80 to the position of the designated track varies dependently upon the position of the designated track (i.e., the distance from the current pickup position). Therefore, the transfer is completed shortly if the pickup is transferred to the relatively near position. In that case, if the information reading by the pickup is started immediately after the completion of the pickup movement, the audio information may not be correctly reproduced or the above mentioned external digital amplifier and the D/A converter may not be locked because the audio attribute change is not completed yet. For this reason, the system controller 100 transfers the pickup to the position of the start address and then commences the information reading after the pause state for a predetermined time period X. The audio attribute setting in the audio decoder 93 normally takes 1 second and the external digital amplifier and the D/A converter take normally 1 or 2 second for locking. Namely, they never exceed 5 seconds, and hence the user may be entitled to determined the pause state time period X of the pickup 80 between 0.5 to 5 seconds, as a user-alterable function, in consideration of the processing speed of the system. Of course, any default value may be set within the above range.

(3) Successive Reproduction

Next, the successive reproduction control of plural tracks (songs) will be described with reference to the flowchart of FIG. 10. It is assumed that, when the operation of the flowchart of FIG. 10 is started, a certain song recorded on the same DVD is being reproduced. The audio centralized information 13 shown in FIG. 6 is read out beforehand from the video manager 2 of the DVD and is stored in the memory 100a in the system controller 100. It is noted that the operation shown in FIG. 10 is mainly performed by the system controller 100 and the system microcomputer 124 in the audio decoder 93.

First, the system controller 100 receives the song change instruction (step S1). The reception of the song change instruction is made in plural patterns. The one example is the case where the user chooses one of the plural Groups recorded on the DVD to reproduce it. For example, when the user refers to the audio centralized information 13 shown in FIG. 6 and chose the Group-1, the system controller 100 reproduces the track-1 to track-6 of the Group-1. At this time, the song is changed from the track-1 to track-2 and then from track-2 to track-3, and the song change instruction is supplied to the system controller 100 at the ending timing of the tracks, i.e., transitions of the tracks.

When the song change instruction is inputted, the system microcomputer 124 then supplies the control signal to the signal processing unit 120 to allow the internal digital filter to output digital "0" data to the D/A converter 121 (step S3). By this, the output analog signal of the D/A converter 121 becomes zero-level, and consequently the audio output is muted.

Next, the system controller 100 refers to the audio centralized information 13 in the memory 100a to obtain the audio attribute of the track to be reproduced next (step S5). The audio attribute information obtained this case includes at least the sampling frequency, the quantization bit number, the channel number and the application of emphasis. In addition, the system controller 100 simultaneously obtains the start address and the end address of the next song from the audio centralized information 13.

Next, the system controller 100 supplies the audio attribute information thus obtained to the system microcomputer 124 of the audio decoder 93. The system microcomputer 124 compares the received audio attribute information of the next track with the audio attribute information of the track being reproduced until then, which is stored in the internal RAM 124a (step S7). If they are the same, the process goes to step S17 because the audio attribute change is unnecessary.

On the other hand, if they are not the same, it is necessary to change the audio attribute in the audio decoder 93. Therefore, the system microcomputer 124 controls the clock circuit 125 to change the sampling clock frequency fs (step S9), and then controls the signal processing unit 120 to output the digital "0" data, which is adapted to the sampling frequency and the quantization bit number thus changed, to the D/A converter 121 (step S11). By this, the D/A converter 121 changes the sampling frequency for the digital-to-analog conversion using the internal PLL circuit. Further, the system microcomputer 124 controls the signal processing unit 120 to change the emphasis application and the channel number (step S13). By the process from step S9 to S13, the audio attribute change in the audio decoder 93 is completed. It is noted that, while the actual setting change in the audio decoder 93 normally takes about 1 second as mentioned, this is peculiar to the device and there is no large difference between devices. However, the external digital amplifier and the D/A converter may have relatively large locking time difference. The pause state time period X should be determined in consideration of these times. It is noted that the pause state time period X may be user-alterable as a function of the reproduction apparatus.

Next, the system controller 100 issues the search instruction to the drive controller 101 to transfer the pickup 80 to the start address obtained in step S5 (step S15), and then starts counting the passage of time (i.e., the search time T) (step S17). Next, it is determined whether the pickup transfer is completed or not (step S19). If it is completed, the counting of the search time T is terminated (step S21).

Next, the system controller 100 compares the search time T thus counted with the predetermined pause state time period X (step S23). If the search time X is longer than the time period X (step S23: NO), it is supposed that the audio attribute change in the audio decoder 93 as well as the locking of the external digital amplifier and the D/A converter has been completed, and the reproduction instruction of the track is issued and the audio output muting is released (step S27). In response, the reproduction of the next track begins. On the contrary, if the search time T is shorter than the pause state time period X (step S23:YES), the system controller 100 waits for the difference time of them (i.e., X-T), and then issues the reproduction instruction of the track (step S27). Namely, the reproduction of the next track never begins before the time period X passes from the start of the track search (step S17), and this ensures the correct reproduction of the next track which requires the attribute change. In this way, the successive reproduction of the songs are executed.

Next, the description will be given of the examples, in the successive song reproduction, in which the audio attribute changes and does not change. If the user instructed the reproduction of the track-1 to track-6 of the Group-1 in the this order in the reproduction of the DVD having the audio centralized information shown in FIG. 6, the track change instruction to the next track is given to the system controller 100 at the reproduction ending timings of the tracks. However, in this case, since the next track has the same audio attribute, the step S7 results in YES and the reproduction of the next track is continued with the same audio attribute.

On the contrary, it is assumed that the user instructs the reproduction of the track-1 to track-5 of the Group-3 in this order. Since the group-3 is the Group of Collection, the songs included therein may have tracks having different audio attribute. For example, when the reproduction goes from the track-1 to the track-2 of the Group-3 or from the track-4 to the track-5 of the Group-3, the audio attribute changes. Therefore, the step S7 results in NO, the audio attribute is changed to the new attribute in the audio decoder 93, and the reproduction is started.

In this case, if the audio centralized information is not recorded in the video manager 2 of the DVD, the system controller 100 is required to search for the audio attribute information 12 (see. FIG. 4) of the VTS, which includes the next track, from the control data 11 for the plural VTS recorded in the internal memory 100a, and then to obtain the identical audio attribute information. Therefore, it takes longer time from the receipt of the song change instruction until the completion of the audio attribute change in the audio decoder 93. If the reproduction of the next song is started before the completion of the audio attribute change, the initial portion of the song may not be correctly reproduced. If the reproduction is started after the completion of the audio attribute change, the user should wait for a long time until the next song is started.

In this respect, according to the present invention, since the audio attribute information is recorded in the video manager 2 as a part of the audio centralized information, the audio attribute of the next song may be quickly obtained by referring to the video manager 2, thereby avoiding the above mentioned problem and enabling the smooth transition of the songs having different attributes. In addition, since the reproduction is not started within the pause state time period X after the reception of the song change instruction, it is possible to ensure the time necessary for the audio attribute change in the audio decoder 93 and the time necessary for the lock operation of the external digital amplifier and the D/A converter, irrespective of the search time required to transfer the pickup to the position of the next track, thereby accomplishing the correct reproduction.

(4) Alternative Reproduction without Audio Centralized Information

The above description made on the assumption that the audio centralized information is recorded in the video manager 2. However, if the audio attribute information is not recorded in the video manager, the quick and smooth reproduction can be made by the alternative method described below.

Normally, information of the video manager 2 and the control data 11 of each VTS are stored in the memory 100*a* in the system controller 100 when the audio DVD is set to the reproduction apparatus. Therefore, the reproduction apparatus may be so designed as to produce the audio centralized information table like FIG. 6 using the audio attribute information 12 in the VTSs at this timing, and then the table thus produced is stored in a memory in the reproduction apparatus. Specifically, the system controller 100 refers to the VTS information in the video manager 2 to obtain the recording address of the VTS, and then moves to the address to obtain the audio attribute information included in the control data of the VTS. Then, the contents of the audio attribute information is read out to produce table in the internal memory 100*a*. Next, the system controller 100 specifies the PGC and PGCI constituting the corresponding PTT from the PTT search pointers recorded in the VTS, and detects and stores the recording address on the DVD of the audio information (track) corresponding to the PTT into the memory 100*a*. By executing the above processing for all VTSs, the system controller 100 produces the centralized information table as shown in FIG. 6 in the memory 100*a*.

At the time of the reproduction, upon receipt of the track change instruction, the system controller 100 controls the reproduction of the tracks based on, not the audio attribute information 12 in each VTS, but the audio centralized information table thus prepared in the memory 100*a*. By this, the quick and smooth reproduction may be performed even in the case of the DVD in which audio centralized information is not recorded in the video manager.

In the above description, the reproduction of the tracks in the Group of Collection is exemplified as a case in which songs of different attributes are successively reproduced. However, the application of the present invention is not limited to this feature. For example, if the user designates a certain track in the Group-2 as a next song to be reproduced during the reproduction of a certain track in the Group-1 in FIG. 6, the tracks of different audio attributes are successively reproduced. The present invention is applicable to any cases like the above case in which plural tracks (songs) are successively reproduced. In addition, the present invention enables reproduction and recording of randomly selected songs having the same attribute with a constant interval between the songs.

What is claimed is:

1. A reproduction apparatus for reproducing information from an information storage medium, wherein the information storage medium comprises:
   a recording information area; and
   an aggregate attribute information area,
wherein the recording information area comprises:
   a group information area where one or more group information objects are recorded, each of the group information objects including one or more unit audio information which are logically defined; and
      a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein
   one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data,
wherein the one or more unit audio information attribute information pieces are recorded in a one-to-one correspondence between each of attributes and each of the corresponding unit audio information and the reproduction apparatus comprises:
   a reading unit which reads information from the information storage medium;
   a storage unit which stores the aggregate attribute information read by the reading unit;
   an input unit which receives, from a user, a reproduction instruction designating the unit audio information to be reproduced successively; and
   a reproduction unit which sets the attribute for the reproduction based on the aggregate attribute information stored in the storage unit and reproduces the unit audio information designated by the user in accordance with the attribute set, wherein said reproduction unit comprises:
   an obtaining unit which obtains the attributes corresponding to the unit audio information designated by the user from the aggregate attribute information stored in the storage unit;
   a determining unit which determines whether or not the obtained attributes of the unit audio information to be successively reproduced are identical; and an attribute change unit which starts an attribute setting of the unit audio information to be reproduced next immediately after the reproduction of the unit audio information currently reproduced, if the determining unit determines that the attributes are different.

2. The reproduction apparatus according to claim 1, wherein the reproduction unit further comprises a search unit which transfers the reading unit to a recording position on the information storage medium of the unit audio information to be reproduced next immediately after the reproduction of the unit audio information currently reproduced, and allows the reproduction unit to start reproduction of the unit audio information to be reproduced next after a predetermined waiting time has passed from the start of the transfer of the reading unit.

3. The reproduction apparatus according to claim 2, wherein the waiting time is longer than a time required to change the set attribute by the attribute change unit.

4. A reproduction apparatus for reproducing information from an information storage medium, wherein the information storage medium comprises:
   a recording information area and
   an aggregate attribute information area,
wherein the recording information area comprises:
   a group information area where one or more group information objects are recorded, each of the group information objects including one or more unit audio information which are logically defined; and
   a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein
   one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data,
   wherein the one or more unit audio information attribute information pieces are recorded in a one-to-one correspondence between each of attributes and each of the corresponding unit audio information and the reproduction apparatus comprises:
   a reading unit which reads information from the information storage medium;
   a table producing unit which obtains the aggregate attribute information corresponding to the unit audio information recorded on the information storage medium from the reading unit and produces an aggregate attribute information table;
   a storage unit which stores the aggregate attribute information table produced by the table producing unit;
   an input unit which receives, from a user, a reproduction instruction designating the unit audio information to be reproduced successively; and
   a reproduction unit which sets the attribute for the reproduction based on the aggregate attribute information table stored in the storage unit and reproduces the unit audio information designated by the user in accordance with the attribute set, wherein said reproduction unit comprises:
   an obtaining unit which obtains the attributes corresponding to each of the unit audio information designated by the user from the aggregate attribute information table stored in the storage unit;
   a determining unit which determines whether or not the obtained attributes of the unit audio information to be successively reproduced are identical; and
   an attribute change unit which starts an attribute setting of the unit audio information to be reproduced next immediately after the reproduction of the unit audio information currently reproduced, if the determining unit determines that the attributes are different.

5. The reproduction apparatus according to claim 4, wherein the reproduction unit further comprises a search unit which transfers the reading unit to a recording position on the information storage medium of the unit audio information to be reproduced next immediately after the reproduction of the unit audio information currently reproduced, and allows the reproduction unit to start reproduction of the unit audio information to be reproduced next after a predetermined waiting time has passed from the start of the transfer of the reading unit.

6. The reproduction apparatus according to claim 5, wherein the waiting time is longer than a time required to change the set attribute by the attribute change unit.

7. A reproduction method for reproducing information from an information storage medium, wherein the information storage medium comprises:
   a recording information area; and
   an aggregate attribute information area,
wherein the recording information area comprises:
   a group information area where one or more group information objects are recorded, each of the group information objects including one or more unit audio information which are logically defined; and
   a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein
   one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data,
   wherein the one or more unit audio information attribute information pieces are recorded in a one-to-one correspondence between each of attributes and each of the corresponding unit audio information and the reproduction method comprises:
   reading information from the information storage medium;
   storing the aggregate attribute information read in the reading processing storage unit;
   receiving, from a user, a reproduction instruction designating the unit audio information to be reproduced successively; and
   setting the attribute for the reproduction based on the aggregate attribute information stored in the storage unit and reproducing the unit audio information designated by the user in accordance with the attribute set, wherein reproducing the unit audio information comprises:

obtaining the attributes corresponding to the unit audio information objects designated by the user from the aggregate attribute information stored in the storage unit;

determining whether or not the obtained attributes of the unit audio information objects to be successively reproduced are identical; and starting an attribute setting of the unit audio information to be reproduced next immediately after the reproduction of the unit audio information currently reproduced, if it is determined that the attributes are different.

8. The reproduction method according to claim 7, wherein the reproduction method further comprises a search process, the search process comprising:

transferring an information reading position to a recording position on the information storage medium of the unit audio information to be reproduced next immediately after the reproduction of the unit audio information currently reproduced; and starting reproduction of the unit audio information to be reproduced next after a predetermined waiting time has passed from the start of the transfer of the information reading position.

9. The reproduction method according to claim 8, wherein the waiting time is longer than a time required to change the set attribute.

10. A reproduction method for reproducing information from an information storage medium, wherein the information storage medium comprises:

a recording information area; and an aggregate attribute information area, wherein the recording information area comprises:

a group information area where one or more group information objects are recorded, each of the group information objects including one or more unit audio information which are logically defined; and a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data, wherein the one or more unit audio information attribute information pieces are recorded in a one-to-one correspondence between each of attributes and each of the corresponding unit audio information and the reproduction method comprises:

reading information from the information storage medium;

obtaining the aggregate attribute information corresponding to the unit audio information recorded on the information storage medium from the reading unit to produce an aggregate attribute information table;

storing the produced aggregate attribute information table;

receiving, from a user, a reproduction instruction designating the unit audio information objects to be reproduced successively;

setting the attribute for the reproduction based on the aggregate attribute information table stored in the storage unit; and reproducing the unit audio information objects designated by the user in accordance with the attribute set, wherein reproducing the unit audio information comprises:

obtaining the attributes corresponding to the unit audio information designated by the user from the aggregate attribute information table stored in the storage unit;

determining whether or not the attributes of the unit audio information to be successively reproduced are identical; and starting an attribute setting of the unit audio information to be reproduced next immediately after the reproduction of the unit audio information currently reproduced, if it is determined that the attributes are different.

11. The reproduction method according to claim 10, wherein the reproduction method further comprises a search process, the search process comprising:

transferring an information reading position to a recording position on the information storage medium of the unit audio information to be reproduced next immediately after the reproduction of the unit audio information currently reproduced; and starting reproduction of the unit audio information to be reproduced next after a predetermined waiting time has passed from the start of the transfer of the information reading position.

12. The reproduction method according to claim 11, wherein the waiting time is longer than a time required to change the set attribute.

13. An information storage medium comprising:

a recording information area and an aggregate attribute information area, wherein the recording information area comprises:

a group information area where one or more group information objects are recorded, each of the group information objects including one or more unit audio information which are logically defined; and a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data, wherein the one or more unit audio information attribute information pieces are recorded in a one-to-one correspondence between each of attributes and each of the corresponding unit audio information.

14. The information storage medium according to claim 13, wherein the aggregate attribute information area is formed within a management information area where management information is recorded, the management information being information to manage information recorded on the information storage medium.

15. The information storage medium according to claim 14, wherein at least one unit audio information attribute information piece comprises:
 information indicating a sampling frequency of at least one unit audio information; and
 a quantization bit number of the at least one unit audio information corresponding to the at least one unit audio information attribute information piece.

16. The information storage medium according to claim 15, wherein the group information attribute information comprises:
 a number of at least one unit audio information;
 playback time of the at least one unit audio information;
 a start address of the at least one unit audio information on the information storage medium; and
 an end address of the at least one unit audio information on the information storage medium; and
 a corresponding unit audio information attribute information piece.

17. The information storage medium according to claim 14, wherein the group information attribute information comprises:
 a number of at least one unit audio information;
 playback time of the at least one unit audio information;
 a start address of the at least one unit audio information on the information storage medium; and
 an end address of the at least one unit audio information on the information storage medium; and
 a corresponding unit audio information attribute information piece.

18. The information storage medium according to claim 13, wherein at least one unit audio information attribute information piece comprises:
 information indicating a sampling frequency of at least one unit audio information; and
 a quantization bit number of the at least one unit audio information corresponding to the at least one unit audio information attribute information piece.

19. The information storage medium according to claim 18, wherein the group information attribute information comprises:
 a number of at least one unit audio information;
 playback time of the at least one unit audio information;
 a start address of the at least one unit audio information on the information storage medium; and
 an end address of the at least one unit audio information on the information storage medium; and
 a corresponding unit audio information attribute information piece.

20. The information storage medium according to claim 13, wherein the group information attribute information comprises:
 a number of at least one unit audio information;
 playback time of the at least one unit audio information;
 a start address of the at least one unit audio information on the information storage medium; and
 an end address of the at least one unit audio information on the information storage medium; and
 a corresponding unit audio information attribute information piece.

21. A reproduction apparatus for reproducing information from an information storage medium, wherein said information storage medium comprises:
 a recording information area; and
 an aggregate attribute information area,
wherein the recording information area comprises:
 a group information area where one or more group information objects are recorded, each of the group information objects including one or more unit audio information which are logically defined; and
 a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein
one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data,
wherein the one or more unit audio information attribute information pieces are recorded in a one-to-one correspondence between each of attributes and each of the corresponding unit audio information, and the reproduction apparatus comprising:
 a detecting unit which detects the one or more unit audio information attribute information pieces from the aggregate information area; and
 a reproducing unit which reproduces the one or more unit audio information based on the detected one or more unit audio information attribute information pieces.

22. The reproduction apparatus according to claim 21, wherein the aggregate attribute information area is formed within a management information area where management information is recorded, the management information being information to manage information recorded on the information storage medium.

23. The reproduction apparatus according to claim 21, wherein at least one unit audio information attribute information piece comprises:
 information indicating a sampling frequency of at least one unit audio information; and
 a quantization bit number of the at least one unit audio information corresponding to the at least one unit audio information attribute information piece.

24. The reproduction apparatus according to claim 21, wherein at least one unit audio information attribute information piece comprises:
 information indicating a sampling frequency of at least one unit audio information; and a quantization bit number of the at least one unit audio information corresponding to the at least one unit audio information attribute information piece, and wherein the aggregate attribute information area is formed within a management information area where management information is recorded, the management information being information to manage information recorded on the information storage medium.

25. The information storage medium according to claim 21, wherein the group information attribute information comprises:

a number of at least one unit audio information;

playback time of the at least one unit audio information;

a start address of the at least one unit audio information on the information storage medium; and an end address of the at least one unit audio information on the information storage medium; and a corresponding unit audio information attribute information piece.

26. The reproduction apparatus according to claim 21, wherein the group information attribute information comprises:

a number of at least one unit audio information;

playback time of the at least one unit audio information;

a start address of the at least one unit audio information on the information storage medium; and an end address of the at least one unit audio information on the information storage medium; and a corresponding unit audio information attribute information piece, and wherein the aggregate attribute information area is formed within a management information area where management information is recorded, the management information being information to manage information recorded on the information storage medium.

27. The reproduction apparatus storage medium according to claim 21, wherein the group information attribute information comprises:

a number of at least one unit audio information;

playback time of the at least one unit audio information;

a start address of the at least one unit audio information on the information storage medium; and an end address of the at least one unit audio information on the information storage medium; and a corresponding unit audio information attribute information piece, and wherein the corresponding unit audio information attribute information piece comprises:

information indicating a sampling frequency of the at least one unit audio information; and a quantization bit number of the at least one unit audio information corresponding to the corresponding unit audio information attribute information piece.

28. The reproduction apparatus storage medium according to claim 21, wherein the group information attribute information comprises:

a number of at least one unit audio information;

playback time of the at least one unit audio information;

a start address of the at least one unit audio information on the information storage medium; and an end address of the at least one unit audio information on the information storage medium; and a corresponding unit audio information attribute information piece, and wherein the corresponding unit audio information attribute information piece comprises information indicating a sampling frequency of the at least one unit audio information; and a quantization bit number of the at least one unit audio information corresponding to the corresponding unit audio information attribute information piece, and wherein the aggregate attribute information area is formed within a management information area where management information is recorded, the management information being information to manage information recorded on the information storage medium.

29. A reproduction method for reproducing information from an information storage medium, wherein said information storage medium comprises:

a recording information area and an aggregate attribute information area, wherein the recording information area comprises:

a group information area where one or more group information objects are recorded, each of the group information objects including one or more unit audio information which are logically defined; and a control data area where control data including group information attribute information is recorded, the control data corresponding to each of the group information objects and controlling the one or more unit audio information included in the corresponding group information objects in a predetermined order, the group information attribute information indicating attributes of all of the unit audio information included in the group recording information objects and wherein one or more unit audio information attribute information pieces are collectively recorded in the aggregate attribute information area, the one or more unit audio information attribute information pieces corresponding to each of the unit audio information and indicating attributes of the corresponding unit audio information respectively, and wherein the aggregate attribute information area is formed at a position on the information storage medium such that the one or more unit audio information attribute information pieces can be detected prior to the one or more group information objects and the control data, wherein the one or more unit audio information attribute information pieces are recorded in a one-to-one correspondence between each of attributes and each of the corresponding unit audio information, and the reproduction method comprising:

detecting the one or more unit audio information attribute information pieces from the aggregate information area; and reproducing the one or more unit audio information based on the detected one or more unit audio information attribute information pieces.

30. The reproduction method according to claim 29, wherein the aggregate attribute information area is formed within a management information area where management information is recorded, the management information being information to manage information recorded on the information storage medium.

31. The reproduction method according to claim 29, wherein at least one unit audio information attribute information piece comprises:

information indicating a sampling frequency of at least one unit audio information; and a quantization bit number of the at least one unit audio information corresponding to the at least one unit audio information attribute information piece.

32. The reproduction method according to claim 29, wherein at least one unit audio information attribute information piece comprises:
  information indicating a sampling frequency of at least one unit audio information; and
  a quantization bit number of the at least one unit audio information corresponding to the at least one unit audio information attribute information piece, and wherein
  the aggregate attribute information area is formed within a management information area where management information is recorded, the management information being information to manage information recorded on the information storage medium.

33. The reproduction method according to claim 29, wherein the group information attribute information comprises:
  a number of at least one unit audio information;
  playback time of the at least one unit audio information;
  a start address of the at least one unit audio information on the information storage medium; and
  an end address of the at least one unit audio information on the information storage medium; and
  a corresponding unit audio information attribute information piece.

34. The reproduction method according to claim 29, wherein the group information attribute information comprises:
  a number of at least one unit audio information;
  playback time of the at least one unit audio information;
  a start address of the at least one unit audio information on the information storage medium; and
  an end address of the at least one unit audio information on the information storage medium; and
  a corresponding unit audio information attribute information piece, and
  wherein the aggregate attribute information area is formed within a management information area where management information is recorded, the management information being information to manage information recorded on the information storage medium.

35. The reproduction method according to claim 29, wherein the group information attribute information comprises:
  a number of at least one unit audio information;
  playback time of the at least one unit audio information;
  a start address of the at least one unit audio information on the information storage medium; and
  an end address of the at least one unit audio information on the information storage medium; and
  a corresponding unit audio information attribute information piece, and wherein the corresponding unit audio information attribute information piece comprises:
  information indicating a sampling frequency of the at least one unit audio information; and
  a quantization bit number of the at least one unit audio information corresponding to the corresponding unit audio information attribute information piece.

36. The reproduction method according to claim 29, wherein the group information attribute information comprises:
  a number of at least one unit audio information;
  playback time of the at least one unit audio information;
  a start address of the at least one unit audio information on the information storage medium; and
  an end address of the at least one unit audio information on the information storage medium; and
  a corresponding unit audio information attribute information piece, and wherein the corresponding unit audio information attribute information piece comprises:
  information indicating a sampling frequency of the at least one unit audio information; and
  a quantization bit number of the at least one unit audio information corresponding to the corresponding unit audio information attribute information piece, and wherein the aggregate attribute information area is formed within a management information area where management information is recorded, the management information being information to manage information recorded on the information storage medium.

37. An information recording apparatus comprising:
  a first generating device which generates recording information comprising one or more group information objects, each of the group information objects including one or more unit audio information which are logically defined;
  a second generating device which generates additional information comprising control data and unit audio information attribute information pieces, the control data corresponding to each of the group information objects and controlling the one or more unit audio information included in the corresponding group information objects in a predetermined order, and including group information attribute information indicating attributes of all of the unit audio information included in the group recording information objects, and the unit audio information attribute information pieces indicating attributes of the one or more unit audio information respectively; and
  a recording device which records the recording information and the additional information into an information storage medium,
  wherein the unit audio information attribute information pieces are recorded at a position on the information storage medium such that the unit audio information attribute information pieces can be detected prior to the one or more group information objects and the control data,
  wherein the one or more unit audio information attribute information pieces are recorded in a one-to-one correspondence between each of attributes and each of the corresponding unit audio information.

* * * * *